(12) United States Patent
Manojlovski

(10) Patent No.: US 12,462,913 B2
(45) Date of Patent: Nov. 4, 2025

(54) SYSTEM AND METHOD FOR ADMINISTERING MEDICAL REGIMES

(71) Applicant: BELMEDOW PTY LTD, Castle Hill (AU)

(72) Inventor: Belinda Manojlovski, Castle Hill (AU)

(73) Assignee: BELMEDOW PTY LTD, Castle Hill (AU)

( * ) Notice: Subject to any disclaimer, the term of this patent is extended or adjusted under 35 U.S.C. 154(b) by 127 days.

(21) Appl. No.: 17/799,085

(22) PCT Filed: Feb. 10, 2021

(86) PCT No.: PCT/AU2021/050110
§ 371 (c)(1),
(2) Date: Aug. 11, 2022

(87) PCT Pub. No.: WO2021/159175
PCT Pub. Date: Aug. 19, 2021

(65) Prior Publication Data
US 2023/0089570 A1    Mar. 23, 2023

(30) Foreign Application Priority Data
Feb. 11, 2020  (AU) ................................ 2020900368

(51) Int. Cl.
*G16H 20/10*    (2018.01)
*G16H 10/60*    (2018.01)
(Continued)

(52) U.S. Cl.
CPC ............. *G16H 20/10* (2018.01); *G16H 10/60* (2018.01); *G16H 15/00* (2018.01); *G16H 80/00* (2018.01)

(58) Field of Classification Search
CPC ........ G16H 20/10; G16H 10/60; G16H 15/00; G16H 80/00
See application file for complete search history.

(56) References Cited

U.S. PATENT DOCUMENTS 7,928,835 B1 *  4/2011  Jovanov ................. G16H 40/67
                                                     368/10
9,805,163 B1    10/2017  Panch et al.
(Continued)

FOREIGN PATENT DOCUMENTS

WO    2016/064908 A1    4/2016
WO    2017/177235 A1   10/2017

OTHER PUBLICATIONS

Mar. 15, 2021 Search Report issued in International Patent Application No. PCT/AU2021/050110.
(Continued)

*Primary Examiner* — Robert A Sorey
(74) *Attorney, Agent, or Firm* — Williams Mullen; R. Brian Drozd

(57) ABSTRACT

A computer-implemented system for recording, tracking and reporting administration of one or more pharmaceutical treatment regimens, the system including one or more databases wherein details of one or more pharmaceutical treatment regimens are recorded, the databases accessible by processors associated with a first user device having access to the databases by a data communications network, the processors executing instructions that notify a first user, using the first user device, of details of a pharmaceutical treatment regimen associated with the first or second user, record details a pharmaceutical administration in accordance with treatment regimen entered by the first user using the first user device, and non-adherence to the treatment regimen by the first user, automatically notify another user, using a second user device wherein the another user has database access by the data communications network, of the non-adherence to treatment regimen by the first user.

20 Claims, 6 Drawing Sheets

(51) Int. Cl.
*G16H 15/00* (2018.01)
*G16H 80/00* (2018.01)

(56) References Cited

U.S. PATENT DOCUMENTS

| | | | |
|---|---|---|---|
| 2007/0016443 A1* | 1/2007 | Wachman | G16H 20/10 600/300 |
| 2007/0168228 A1* | 7/2007 | Lawless | G06Q 40/08 600/300 |
| 2007/0258626 A1* | 11/2007 | Reiner | G16H 40/20 340/5.82 |
| 2007/0299687 A1* | 12/2007 | Palmer | G16H 10/60 705/2 |
| 2008/0294490 A1* | 11/2008 | Nuhaan | G06Q 10/0631 705/7.19 |
| 2011/0153360 A1* | 6/2011 | Hanina | G16H 20/10 707/E17.014 |
| 2011/0231202 A1* | 9/2011 | Hanina | G06Q 10/10 705/2 |
| 2012/0081225 A1 | 4/2012 | Waugh et al. | |
| 2015/0242585 A1* | 8/2015 | Spiegel | G16H 10/60 705/2 |
| 2016/0196503 A1* | 7/2016 | Guan | G06V 20/66 706/12 |
| 2016/0246943 A1* | 8/2016 | Lake | G16H 15/00 |
| 2017/0296436 A1* | 10/2017 | Ziv | G16H 20/10 |
| 2017/0364655 A1 | 12/2017 | Farooqi | |
| 2018/0307799 A1 | 10/2018 | Herrin et al. | |
| 2019/0080791 A1* | 3/2019 | Wolf | G16H 80/00 |

OTHER PUBLICATIONS

Mar. 15, 2021 Written Opinion of the International Searching Authority issued in International Patent Application No. PCT/AU2021/050110.

May 19, 2022 International Preliminary Report on Patentability issued in International Patent Application No. PCT/AU2021/050110.

* cited by examiner

SYSTEM AND METHOD FOR ADMINISTERING MEDICAL REGIMES

FIELD OF THE INVENTION

The present invention relates to a system and method that facilitates the management and tracking of administration of medical regimes, for example, a medical treatment plan set by a health care professional such as medical practitioner. The present invention finds particular use in managing/tracking the self-administration of a treatment plan or medicine by an individual or the administration of a treatment plan or medicine by a care provider (such as a parent or guardian) to one or more individuals.

BACKGROUND OF THE INVENTION

The task of remembering to adhere to a medical regimen (for example, a treatment plan that involves taking a prescribed dose of one or more medicines or pharmaceuticals on a periodic or regular basis) is difficult for most individuals. More particularly, the elderly find this task increasingly difficult as they experience a decline in their cognitive function and memory.

Difficulties also arise when a parent or guardian has more than one child with a medical condition thereby requiring the parent or guardian to manage multiple medical regimes.

Key factors considered to cause errors in medication administration include lack of training and/or inadequate knowledge of individuals tasked with self-administering a medical treatment (or the care provider tasked with administering the medical treatment). Errors are also known to arise when individuals or care providers are overworked and/or fatigued.

In an effort to assist individuals to adhere to set medical regimens, pharmaceutical dispensers or "pill dispensers" have been devised. Typical pill dispensers usually have seven compartments (each compartment marked with an individual day of the week), thereby requiring an individual or care giver (for example, a parent or guardian) to fill the dispenser with all the medication requirements for the coming week. The individual or care provider then administers the medication on a daily basis from the marked compartment corresponding to the particular day of the week. In the event an individual or care giver forgets to administer the medication on a particular day, the individual will be made aware of the error from observation of the pill dispenser which will retain the medication from the previous day in the corresponding compartment.

However, whilst pill dispensers are useful in assisting individuals to monitor and identify any instances in which one or more doses of medicine have been missed on a daily basis, they do not assist in instances where medication must be administered at specific times during the day and as directed by a medical practitioner. For example, certain treatments must be administered at a specific time of day, for example, in the morning.

Further problems arise when the usual primary care provider is unavailable to administer a treatment, and the task of administering treatment to an individual (for example, an elderly individual or a child) is delegated to a secondary care giver such as a relative, friend or neighbour. The risk of medication dosage errors occurring under such circumstances significantly increases, usually due to the lack of knowledge/experience of the secondary care provider of the individual requiring treatment.

Errors in administering medication or a treatment plan may lead to a temporary, and sometimes even a permanent, increase in severity of symptoms associated with a disease, or a general decline in the health of an individual requiring medical treatment. Frequent errors in administering medication or a treatment plan may possibly result in the death of an individual, in particular, individuals with severe or acute disease states that require long term and consistent medical treatment.

Further issues exist when any confusion arises or exists regarding the frequency and dosage of medication to be administered. Such confusion tends to typically arise as a result of poor communication between the individual/care giver and a health care professional (e.g., doctor, nurse or pharmacist).

The present invention seeks to address the problems discussed herein, or at least provide an alternative solution to existing methods for facilitating the management and tracking of medical regimen administration.

The reference to any prior art in this specification is not, and should not be taken as, an acknowledgement or any suggestion, that the prior art forms part of the common general knowledge.

SUMMARY OF THE INVENTION

In a first aspect, the present invention provides a computer-implemented system for recording, tracking and reporting administration of one or more pharmaceutical treatment regimens, the system including, one or more databases in which details of one or more pharmaceutical treatment regimens associated with the one or more individuals are recorded, the one or more databases accessible by one or more processors associated with a first user device, the first user having access to the databases by a data communications network, the one or more processors executing instructions that, notify a first user, using the first user device, of the details of a particular pharmaceutical treatment regimen associated with the first user or a second user, record details of the administration of a pharmaceutical in accordance with the particular pharmaceutical treatment regimen entered by the first user using the first user device; and in the event of non-adherence to the particular pharmaceutical treatment regimen by the first user, automatically notify another user, different to the first and second user, using a second user device having access to the databases by the data communications network, of the non-adherence to the particular pharmaceutical treatment regimen by the first user.

In an embodiment, the details of the pharmaceutical treatment regimen entered by the first user using the first user device include, but are not limited to, at least the name of the pharmaceutical and any one or more of a dosage amount, a photo of the pharmaceutical/packaging, biometric information/scan, the time(s) of administration, the method of administration (e.g., whether pharmaceutical was taken with water or with food).

In an embodiment, the first user is able to access further details regarding the first user (in the case of self-administration) or the second user (in the case of the first user administering the pharmaceutical to the second user) including the existence of any allergies, medical history, medical record, action plan (in the event of non-adherence) and the contact, medical and emergency details of the first or second user.

In an embodiment, the first user is an individual requiring treatment (i.e., in the instance of self-administration). In an alternative embodiment, the first user is a person administering the pharmaceutical (i.e., a parent, guardian, babysitter, neighbour, teacher or healthcare worker) to the second user (for example, a child, student, family member or patient requiring administration of a pharmaceutical according to the pharmaceutical treatment regimen).

In an embodiment, the one or more processors execute further instructions that cause the system to automatically generate a reminder notification including any one or more of an alarm, a message via short message service (sms), or electronic email (email) on the first and/or second user device.

The reminder notification may serve as a reminder to the first user to administer the pharmaceutical in accordance with the pharmaceutical treatment regimen. The reminder notification may also serve as a reminder to the another user (i.e., a parent or a health-care provider) of the requirement for administration of the pharmaceutical in accordance with the pharmaceutical treatment regimen of the second user (i.e., a child or patient).

In an embodiment, the one or more processors execute further instructions that cause the system to automatically generate an alert notification including any one or more of a telephone call, a vibration alert, an alarm, a message via short message service (sms), or an electronic mail (email) on the first and/or second user device in the instance of non-adherence with the pharmaceutical treatment regimen.

Non-adherence may include a failure to timely administer the pharmaceutical (i.e., by the first user), a failure to update the system (by the first user) following administration of the pharmaceutical treatment, or incorrect administration of the pharmaceutical treatment by the first user.

In an embodiment, a user (e.g., the first user or the another user) is able to set the required time(s) of administration of a pharmaceutical and also set a period of time following the set administration time(s) after which an alert notification is automatically sent in the event of non-adherence. Accordingly, a non-adherence alert notification may be set to be automatically sent after a pre-selected period of time (e.g., half an hour) to the another user (e.g., a parent or health-care provider) in the event of non-adherence.

In an embodiment, the non-adherence notification is automatically and continuously re-sent in the event the first user and/or the another user does not acknowledge same. The re-sent non-adherence notification may escalate in frequency and/or volume in the event the first user and/or the another user does not acknowledge same within a pre-selected period of time.

In an embodiment, the one or more processors are configured to allow the another user (e.g., a health-care provider, or a parent on the advice of a health-care provider) to change/update the details of the pharmaceutical treatment regimen relating to the first user (in the case of self-administration by the first user) or the second user (in the case of administration of a pharmaceutical to the second user by the first user). In an embodiment, the one or more processors are configured to execute instructions that cause the system to automatically notify the first user and/or the another user in the event any details in the pharmaceutical treatment regimen of the first or second user are changed.

In an embodiment, the first user may provide proof of administration of a particular treatment using the first user device. In an embodiment, the proof of administration includes detailed biometric information including one or more of fingerprints, facial identification and/or retinal scan of either of the first and/or second user. In an embodiment, the proof of administration may further include, in addition or as an alternative, an image of the packaging of the administered medication.

In a further aspect, the present invention provides a computer-implemented method of recording, tracking and reporting administration of one or more pharmaceutical treatment regimens, the method including, notifying a first user, using a first user device, the details of a particular pharmaceutical treatment regimen associated with the first user or a second user, recording, using the first user device, details of the administration of a pharmaceutical according to the particular pharmaceutical treatment regimen; and in the event of non-adherence to the particular pharmaceutical treatment regimen by the first user, automatically notifying another user, different to the first and second user, using a second user device, of the non-adherence to the particular pharmaceutical treatment regimen by the first user.

In yet another aspect, the present invention provides a computer-readable medium having a plurality of instructions executable by one or more processors to perform the steps of, notifying a first user, using a first user device, the details of a particular pharmaceutical treatment regimen associated with the first user or a second user, recording, using the first user device, details of the administration of a pharmaceutical according to the particular pharmaceutical treatment regimen; and in the event of non-adherence to the particular pharmaceutical treatment regimen by the first or second user, automatically notifying another user, different to the first and second user, using another user device, of the non-adherence to the particular pharmaceutical treatment regimen by the first user.

BRIEF DESCRIPTION OF THE DRAWINGS

Embodiments of the invention will now be described in further detail with reference to the accompanying figures in which.

Figure 1:
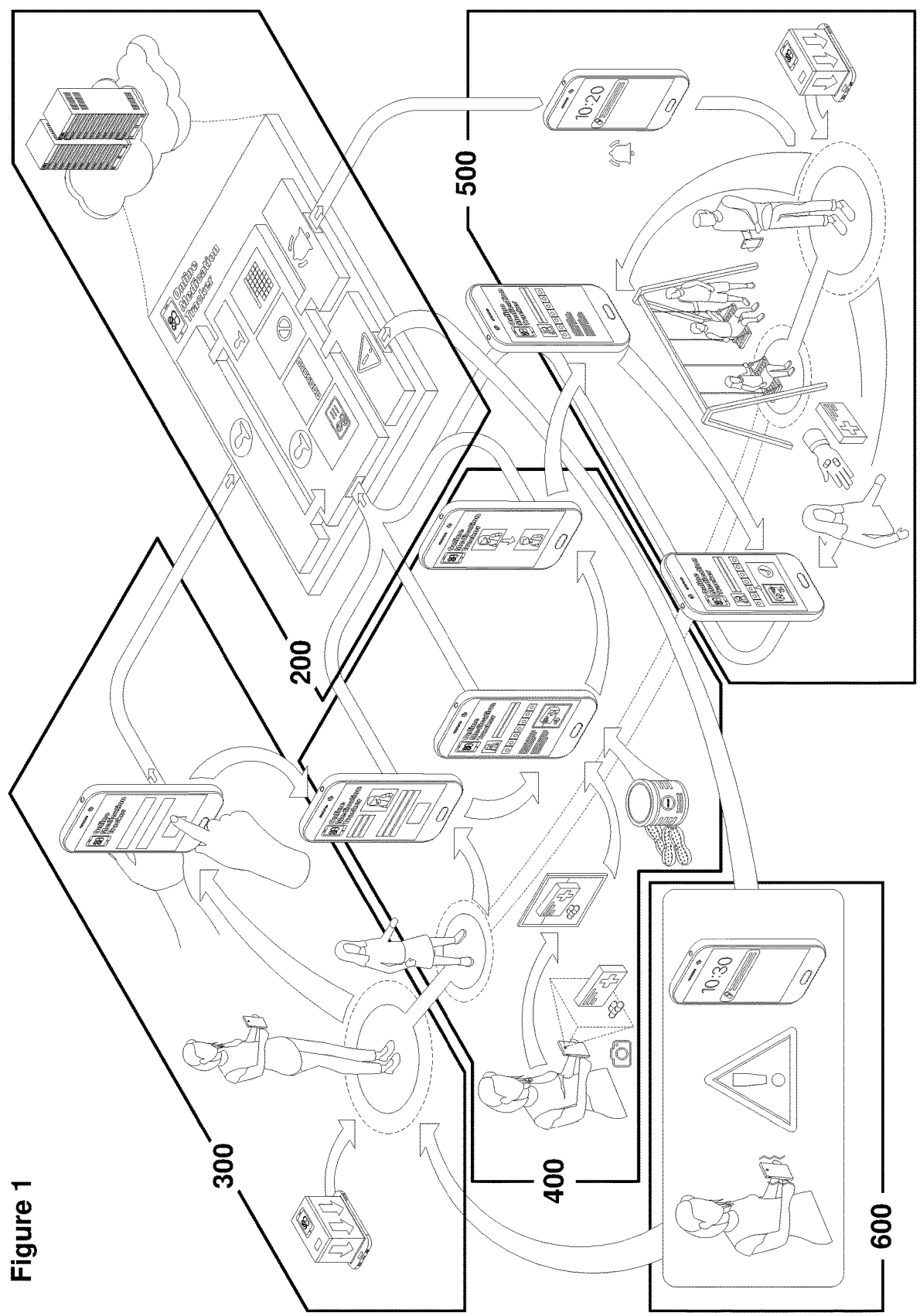
FIG. 1 illustrates an exemplary system for recording, tracking and reporting administration of one or more pharmaceutical treatment regimens.

DETAILED DESCRIPTION OF
EMBODIMENT(S) OF THE INVENTION

The present invention relates to a system and method for recording, tracking and reporting administration (240) of one or more pharmaceutical treatment regimens (44) (also referred to herein as a medication routine). According to an aspect, the system and method involves notifying a first user responsible for administering a pharmaceutical treatment regimen (44) to a patient (100), using a first user device (120), details of a particular pharmaceutical treatment regimen (44) associated with the patient (100). Further, the system and method involves the first user (90) recording (250), using the first user device (120), details of the administration (240) of a pharmaceutical (170) or other treatment to the patient (100) according to the particular pharmaceutical treatment regimen (44). In the event of non-adherence with the particular pharmaceutical treatment regimen (44) by the first user (90), automatically notifying (260, 265) another user (90A), on a second user device (120), of the non-adherence with the particular pharmaceutical treatment regimen (44) by the first user (90).

Example scenarios, according to different implementations of the invention, include, but are not limited to, the following:

a. where the patient (100) is capable of self-administering the treatment regimen (44) himself or herself, in which case the patient is the "first user" (90), and "another user" (90A) who is notified in the case of non-adherence is a primary guardian, such as a parent, of the self-administering patient (100);

b. where the patient (100) is not capable of self-administering the treatment regimen (44), the "first user" (90) is a temporary guardian tasked with overseeing administration of the regimen (44) such as a babysitter, family member, nurse or teacher for example, and "another user" (90A) is a primary guardian, such as a parent, of the patient (100);

c. where the patient (100) is not capable of self-administering the treatment regimen (44), the "first user" (90) is a primary or secondary guardian tasked with overseeing administration of the regimen (44) at any one time, such as a parent, babysitter, family member, nurse or teacher, and "another user" (90A) is a carer such as a doctor or medical practitioner who may even be the person responsible for creating the particular regimen (44) for the patient (100).

The skilled reader would appreciate that numerous additional implementations are possible and the above implementations are described by way of example only and are not intended to be limiting.

FIG. 1, which provides an exemplary overview of the system and method of the present invention, is divided into five distinct segments which are further expanded in the subsequent FIGS. 2 to 6.

Figure 2:
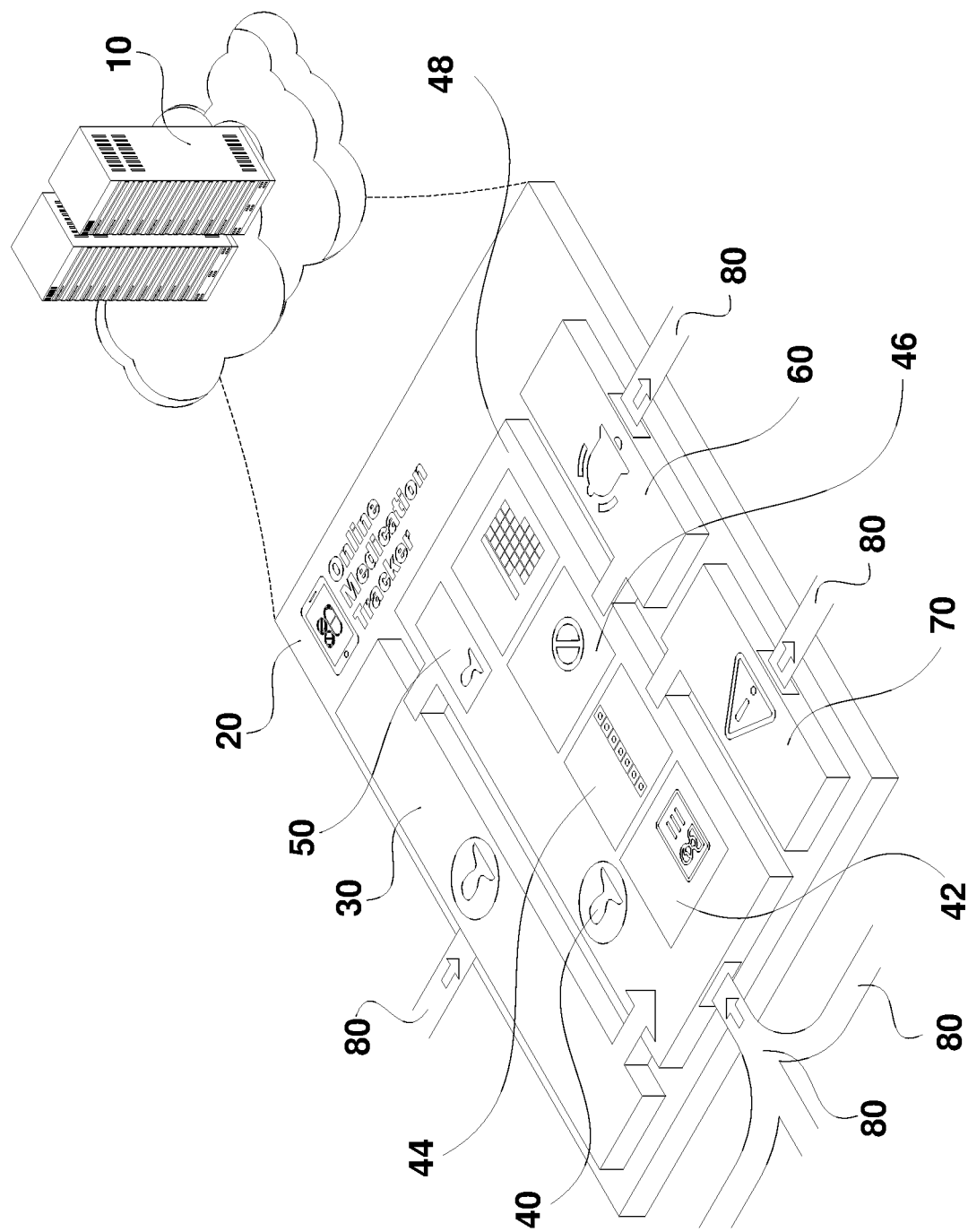
FIG. 2 illustrates an exemplary server component which forms part of the system illustrated in FIG. 1.

For example, in FIG. 1, segment (200) shows the server component (20) (also referred to herein as a central server) with which one or more applications (130) operating on one or more user devices (120) communicate, and this is expanded in FIG. 2. Segment (300) of FIG. 1 shows a first user (90), who as described above may also be the patient (100), installing the application (130), logging into the application (130), and registering and creating a new user account (30), which is expanded in FIG. 3. Segment (400) of FIG. 1 shows the first user (90) creating a patient profile and then sharing same with another user (90A), which is expanded in FIG. 4. Also shown in FIG. 1 is segment (500) which shows how the first user (90) can view a patient's profile and medication routine (44), receive reminders (230) to administer medication (240), and record (250) that medication has been administered, which is expanded in FIG. 5. Finally, segment (600) of FIG. 1 shows how another user (90A) receives a medication alert (260, 265), indicating non-adherence with the patient medication regimen or routine (44), which is expanded in FIG. 6.

As mentioned above, FIG. 2 shows in further detail the segment 200 from FIG. 1. In particular, FIG. 2 shows infrastructure (10) on which a central server (20) operates, which may be a local or cloud-based infrastructure. Client applications (130) (not shown in FIG. 2) communicate (80) with the central server (20), and the central server operates one or more computer applications that provide the core functions of the server (20), including:

providing a register (30) of users which may include first users (90) and other users (90A) who are registered to use the solution;

providing a register (40) of patients (100) and in particular patient records created by a user (90, 90A) that contains patient details (42), a patient medication routine (44), details of allergies (46) and care arrangements (48), as described in greater detail below;

providing functionality (50) which enables a user such as a primary guardian (90A) of a patient (100) to share a patient profile (40) with another user (90) who has tasked the first user (90) to adhere to the regimen (44) whilst the patient (100) is under the first user's (90) temporary supervision;

providing functionality (60) that enables reminders to be generated to remind a user (90) that a patient (100) requires medication or some other treatment according to the regimen (44);

providing functionality (70) that enables alerts to be generated when non-adherence to the treatment regimen (44) is detected.

Users, such as patient (100), user (90) and another user (90A) may access the server (20) using user devices such as mobile devices (120) or through use of any suitable browser application via the internet or similar network.

Each patient profile (40) may include patient details (42) which may include medical and emergency contact details, the patient treatment regimen (44) which may include a type of medication to be taken, which days and times to administer the medication, and any additional relevant information such as whether a particular medication should be taken with a particular food or drink. The following is a more comprehensive listing of the details that may be included in a pharmaceutical treatment regimen (44):

name of the pharmaceutical;
active constituents of the pharmaceutical;
dosage amount;
photo of pharmaceutical/packaging for identification purposes;
frequency of administration;
time of administration;
method of administration (e.g., with water or with food);
any contra-indications;
patient allergies (46) which may include information regarding what the user (90) should do if the patient (100) consumes an item they have an allergic reaction to;
patient medical history (medical record);
calendar or diary (48) indicating which user (90) will be overseeing adherence to the regimen (44) and when;
details or an action plan in the event of non-adherence with the pharmaceutical treatment regimen; and
patient medical and emergency contact details.

Non-adherence with the medication routine (44) may be recorded on the basis of detecting one or more of the following:

failure to administer a treatment (e.g., by the self-administering patient (100) or the first user (90) tasked with administering medication);

failure to update the system (e.g., by the self-administering patient (100) or the first user (90) tasked with administering medication); and incorrect administration of pharmaceutical treatment by the patient (100) or user (90).

Figure 3:
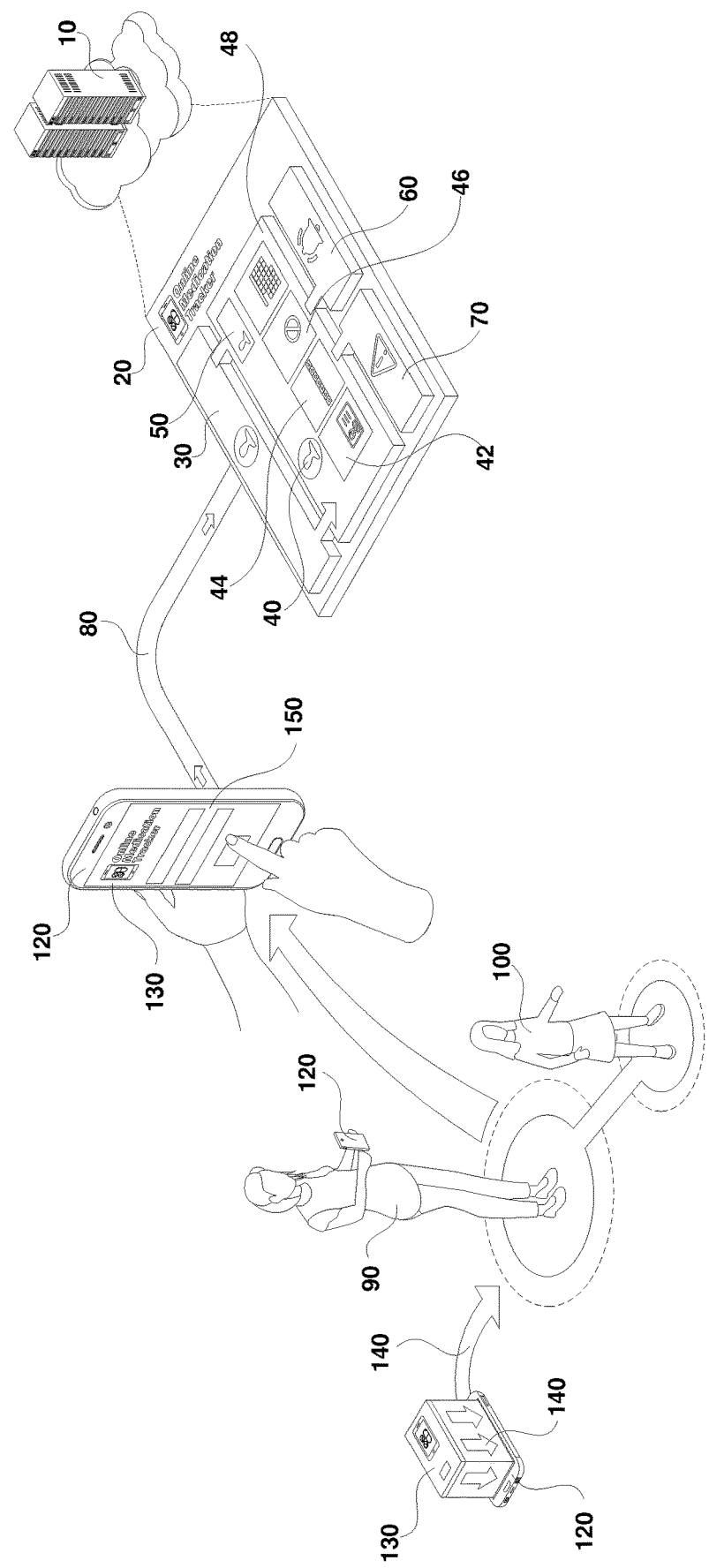
FIG. 3 illustrates an exemplary flow diagram of a process that enables a user to interact with the system illustrated in FIG. 1.

FIG. 3 shows in greater detail segment 300 of FIG. 1 and illustrates how a first user (90), whether it be a self-administering patient (100) or temporary guardian, may download and install the application (130), then logging in and registering as a user. A patient (100) may be a person such as a child or elderly parent that requires regular medication and is looked after by a user (90) and at certain times by other users (90A), such as carers.

The user device (120) may be a mobile phone, tablet, laptop, or any other computer that may be used to operate the application (130), and is a device that may be used to download and install the application (130), typically from an applicable application store. All users will be required to login using their login details or register as a new user of the application (130), and registration may require user credentials and may also require the payment of a fee to use the application (130).

The process of installing the application (130) is shown in FIG. 3 under reference numeral (140) and the process of logging in/registering is also shown in FIG. 3. An example login/registration display (150) is shown, which is a function provided by application (130). As will become apparent, application (130) is also responsible for providing a number of additional functions.

Figure 4:
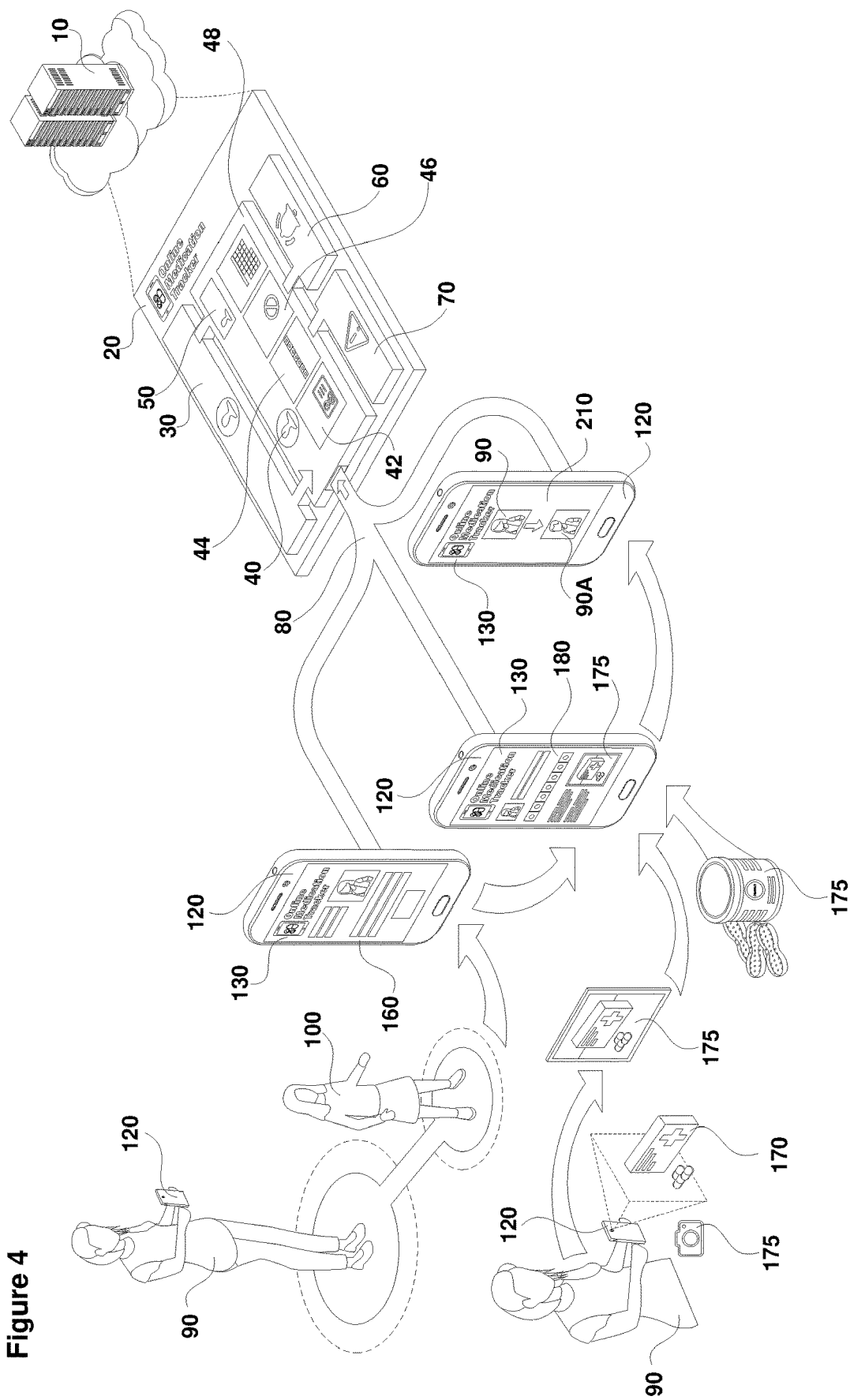
FIG. 4 illustrates an exemplary flow diagram of a process that enables the creation of a patient profile which includes a treatment regimen for the patient.

FIG. 4 shows in greater detail segment 400 of FIG. 1 and illustrates how a user (90, 90A) or a patient (100) may create a patient profile. In the embodiment shown, the patient (100) is a child and the user (90) is the child's primary guardian, i.e. mother, who is tasked with ensuring the patient adheres to the treatment regimen (44). As shown, the user (90) may share the profile with another user (90A), which in the embodiment shown is a primary carer, i.e. the child's doctor. A user (90), such as a patient or a primary or temporary guardian, can create multiple profiles. For example, primary guardians such as parents may create profiles for multiple family members, including their children, themselves and even their elderly parents. It is to be understood that users (90, 90A, 100) may create as many different profiles as required, and as outlined above, the profile may contain details of the patient including medical and emergency contact details.

The functionality (160) of application (130) to create and maintain a patient profile is shown by way of example in screen (160) in FIG. 4. Once the patient profile (40) has been created, the user (90, 90A, 100) can then enter the pharmaceutical treatment regimen (44). By way of example, FIG. 4 shows a parent accessing the child's medication routine. However, if the patient (100) is capable, he or she may enter their own routine, or the primary carer (90A) such as a doctor may be tasked with creating the regimen (44). As already outlined above, the regimen or routine (44) may refer to the type of medication (170) that is required to be administered, as well as other details as already described above including which days and times within a week the medication should be administered and whether it should be administered with food or drink.

To assist with the identification of medication (170), the user creating the patient profile can also include photos or images (175) of the medication packaging to assist users (90) who are overseeing administration of the medication to the patient (100) in identifying the correct medication, which is particularly useful when the patient (100) requires multiple medications or treatments. An example application screen (180) is shown in FIG. 4 and displays an exemplary medication routine (44) including the image (175) of the medication (170). As mentioned previously, allergy information can also be displayed including recommendations regarding steps to take if the patient consumes an item with which they have an allergic reaction.

When the patient enters into a user's (90) care, such as (in the case of a child) a temporary guardian such as a teacher at school, a grandparent or a babysitter, the user (90) can share the child's profile with another person (90A), such as a primary guardian, (i.e. mother, father, etc) and indicate when they have care of the patient. If the other user (90A) is not already registered as a user of the application (130), then according to an embodiment, they may be invited to join as a new user. An exemplary share patient record screen (210) is shown in FIG. 4 which allows the other user (90A), prior to placing the patient (100) into the care of the temporary guardian, to define care arrangements (48), (e.g. a calendar or diary that lists who will be caring for the patient (100)) and at which times of the day or which days of the week, etc. As shown on the display (210), the user (90) can share the child's profile with the other user (90A) when the patient is in the user's (90) care, and indicate when they have care of the patient (100).

It is to be understood that the other user (90A) is not necessarily limited to a temporary guardian such as a grandparent, teacher or babysitter, and may also include a medical provider, such as a doctor, nurse or hospital for example. The medical provider may have access to the server (20), through a data communications network, to enable the medical provider (90A) to enter details, and according to some implementations, update details with respect to the pharmaceutical regimen (44) relating to the particular patient (100). In some implementations, the other user (90A) may have system administrator access and may be notified when any other user logs in or out of the application (130). The application (130) may also enable different levels of permission to be granted to different users. For example, a primary carer such as a doctor (90A) may be granted full access and full ability to amend or update the regimen (44), whereas a user (90) such as a temporary guardian may be provided read-only access to the regimen (44).

Figure 5:
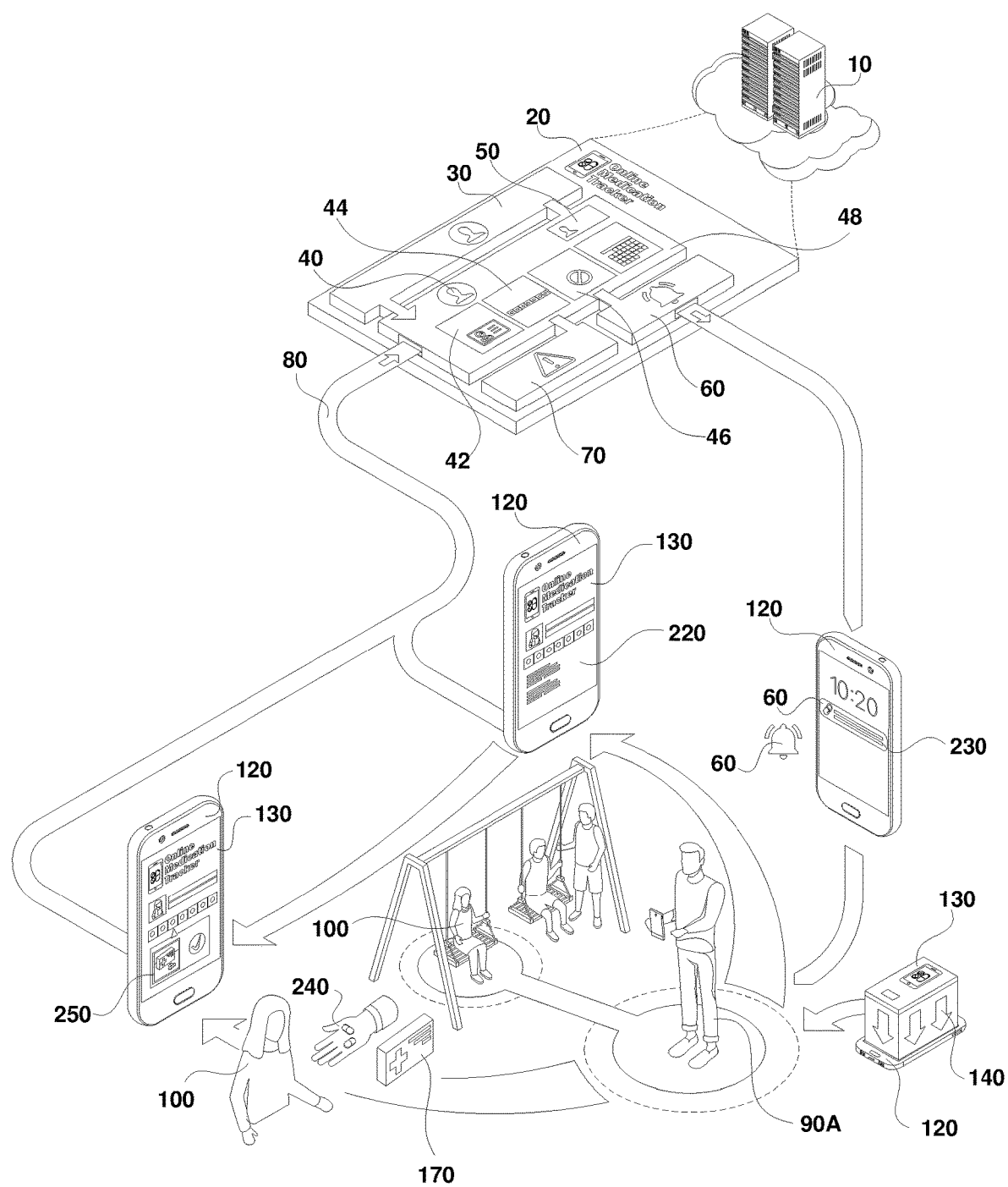
FIG. 5 illustrates an exemplary flow diagram of a process that enables tracking and reporting administration of a pharmaceutical according to the particular treatment regimen recorded for the patient.

FIG. 5 shows in greater detail segment 500 of FIG. 1 and illustrates how a user (90) may view a patient profile (40) and medication routine (44), receive reminders (230) to administer (240) medication (170), and record, as shown by way of example in screen (250) of FIG. 5, that the medication has been administered. The medication reminder notifications (230) may be in the form of a push notification, an automatic telephone call, an audio alert (alarm), a vibration alert, SMS or email message to alert the user to a medication reminder (60).

Once the patient profile (40) is shared with another user, the other user can view the patient's medication routine (44) and additional details including medical information, allergies, and emergency contact details. Users, depending on the level of write-access granted to them, may elect to configure the application (130) to remind them that a patient in their care requires medication, and in some implementations, all or a selected subset of users may be automatically sent a notification if any details regarding the regimen or routine (44), and/or the patient requiring treatment, have changed.

Once the treatment has been administered, the user (90) can record that the treatment or dose has been administered and if required, the application (130) can request further evidence such as a photo of the medication being administered. This would also enable other users (90A) to be able to immediately observe (or be notified) that the dose has been administered, as shown by way of example in screen (250) of FIG. 5. In some implementations, the proof of administration of a particular treatment may involve the user (90) uploading biometric information including one or more of the patient's fingerprints, the patient's facial identification, retinal scan and alternatively, or in addition, an image of the administered medication (170).

Figure 6:
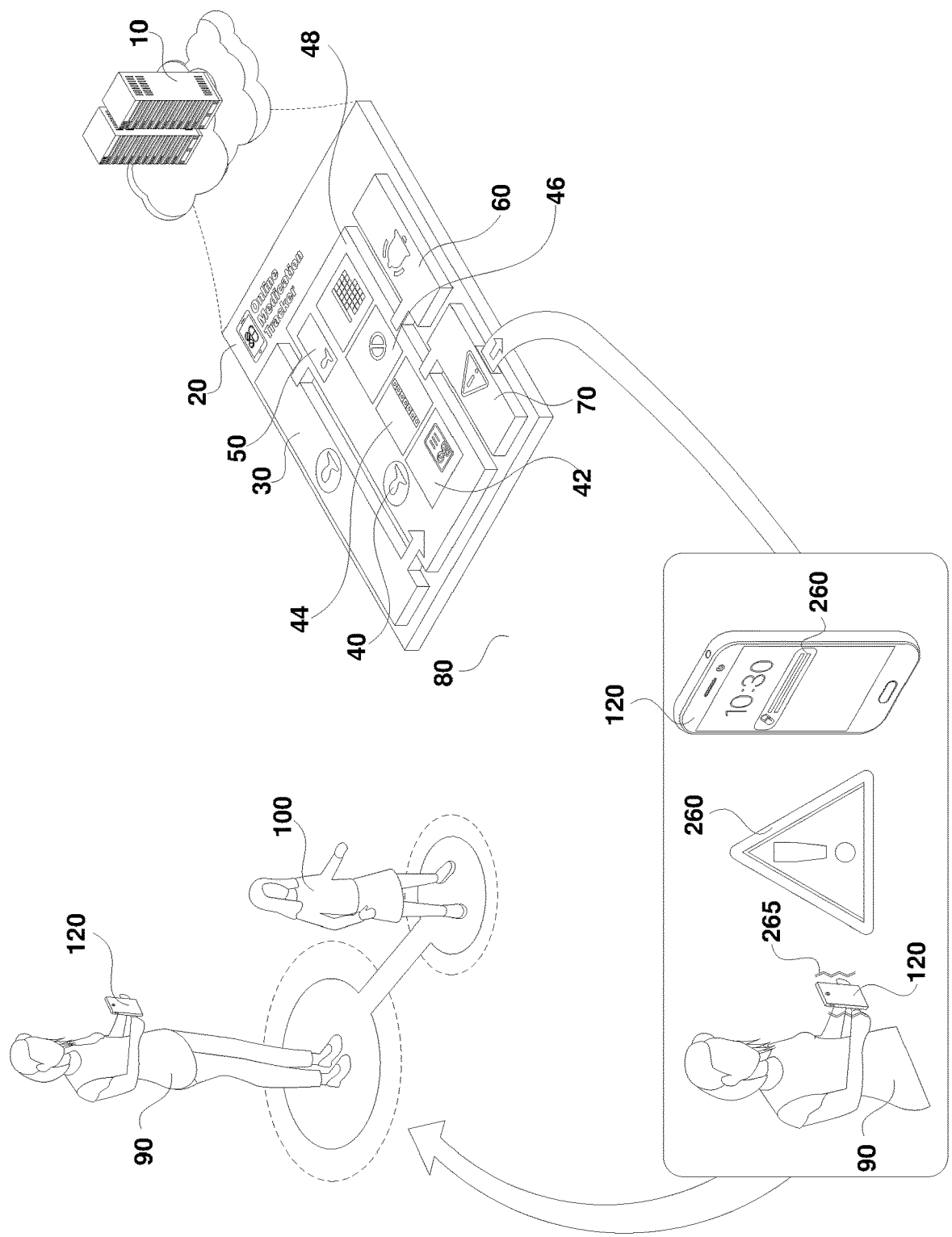
FIG. 6 illustrates an exemplary flow diagram of a process that enables a user to receive notifications and alerts with respect to non-adherence to the particular treatment regimen.

FIG. 6 shows in greater detail segment 600 of FIG. 1 and shows a user (90) receiving a medication alert notification (260), which may be push notification, SMS, or email message, indicating that a dose of medication or other treatment has not been administered in accordance with the regimen or routine (44). For example, non-adherence may be detected on the basis that the treatment has been missed completely, or has not been administered according to required guidelines. When non-adherence to the regimen (44) is detected, the user (90) (as well as other users (90A) if applicable) may be alerted, and again this may be achieved using push notifications, an automatic telephone call, an audio alert (alarm), a vibration alert, SMS or email, by way of example. The relevant user (90) or other user (90A), can then decide the most appropriate course of action.

The application (130) may also be programmed to link with other devices, for example, cameras or other electronic devices in a home or room in which the patient (100) resides. For example, the application (130) may be programmed to automatically operate cameras in the vicinity of the patient (100) when non-adherence with the medical regimen (44) is detected. Such cameras may already be accessible to the other user (90A) who is afforded the benefit of being able to visualize the status of the patient (100) and potentially even the reason for non-adherence, which may be particularly useful in situations where the temporary guardian is not well known to the primary carer.

The alert notification could also be in the form of a vibration or audio notification (265), and the type of alert may be pre-set by a user by adjusting settings in their own user device (120) and/or the application (130).

Non-adherence notifications may automatically be sent after a pre-set or pre-selected period of time, e.g. half an hour after the lack of administration is detected, and the notifications may escalate in frequency if the relevant user does not acknowledge same.

The user device (120) could be a tablet computer, a smartphone, a laptop computer, a desktop computer, or another type of computing device. The user device may include a display that provides an interface for the user to input and/or view information. For example, a user could interact with the device using a program executed on a laptop computer, such as a text-based chat program, a voice-based communication program, and/or a video-based communication program. Alternatively, in some cases, the user device (120) could be a telephone (e.g., a landline, cell phone, etc.).

The central server (20) may be a single computer, the partial computing resources of a single computer, a plurality of computers communicating with one another, or a network of remote servers (e.g., cloud). The one or more servers can host local databases and/or communicate with one or more external databases.

The user device (120) may communicate with the server (20) over a network. In some embodiments, the network may be a wide segment network ("WAN"), e.g., the Internet. In other embodiments, the network may be a local segment network ("LAN"). For example, in a more remote location far from a metropolitan segment, the Internet may not be available. In yet other embodiments, the network may be a combination of a WAN and a LAN. In embodiments where the mobile device (120) is a phone (e.g., a landline or a cell phone), the communication may pass through a telecommunications network and/or a wide segment network.

The system and method may also include tracking the location of a user (90) so that in the event of non-adherence to a treatment regimen, the user (90) may be located and the medication can be administered as soon as possible. In an embodiment, central server (20) operates one or more further computer applications that includes functionality that enables a user's (90) location to be identified by GPS coordinates.

It will be appreciated by persons skilled in the relevant field of technology that numerous variations and/or modifications may be made to the invention as detailed in the embodiments without departing from the spirit or scope of the invention as broadly described. The present embodiments are, therefore, to be considered in all aspects as illustrative and not restrictive.

Throughout this specification and claims which follow, unless the context requires otherwise, the word "comprise", and variations such as "comprises" and "comprising", will be understood to imply the inclusion of a stated feature or step, or group of features or steps, but not the exclusion of any other feature or step or group of features or steps.

The invention claimed is:

1. A computer-implemented system for recording, tracking and reporting administration of one or more pharmaceutical treatment regimens, the system comprising:
   one or more databases in which details of one or more pharmaceutical treatment regimens associated with the one or more individuals are recorded;
   the one or more databases accessible by one or more processors associated with a first user device, the first user device having access to the databases by a data communications network, the one or more processors executing instructions that:
   notify a first user, using the first user device, of the details of a particular pharmaceutical treatment regimen associated with the first user or a second user;
   record details of the administration of a pharmaceutical in accordance with the particular pharmaceutical treatment regimen entered by the first user using the first user device; and
   in the event of non-adherence to the particular pharmaceutical treatment regimen by the first user:
      automatically notify a third user, different to the first and second user, using a third user device associated with the third user having access to the databases by the data communications network, of the non-adherence to the particular pharmaceutical treatment regimen by the first user;
      identify the location of the first user and/or the second user according to the GPS coordinates of the first user device associated with the first user or a second user device associated with the second user and send a notification to the third user device associated with the third user of the location of the first user and/or the second user; and
      automatically operate a camera in the vicinity of the first user and/or the second user;
   wherein the one or more processors are also configured to enable the first user to access details regarding the medical history of the first user or the second user, the medical history comprising details regarding any allergies, medical record, action plan (in the event of non-adherence) and contact, medical and emergency details associated with the first or second user.

2. The computer-implemented system according to claim 1, wherein the details of the pharmaceutical treatment regimen entered by the first user using the first user device comprise at least the name of the pharmaceutical and any one or more of a dosage amount, a photo of the pharmaceutical/packaging, biometric information, a time(s) of administration and a method of administration.

3. The computer-implemented system according to claim 1, wherein the one or more processors execute further instructions that cause the system to automatically generate a reminder notification comprising any one or more of an alarm, a message via short message service (sms), or electronic email (email) on the first and/or second user device.

4. The computer-implemented system according to claim 1, wherein the one or more processors execute further instructions that cause the system to automatically generate an alert notification comprising any one or more of a telephone call, a vibration alert, an alarm, a message via short message service (sms), or an electronic mail (email) on the first and/or second user device in the instance of non-adherence with the pharmaceutical treatment regimen.

5. The computer-implemented system according to claim 4, wherein the one or more processors are configured to automatically generate and send the alert notification after a pre-selected period of time in the event of non-adherence.

6. The computer-implemented system according to claim 4, wherein the one or more processors are configured to automatically re-send the alert notification in the event the first user and/or the third user does not acknowledge same within a pre-selected period of time.

7. The computer-implemented system according to claim 6, wherein the re-sent alert notification automatically escalates in frequency and/or volume in the event the first user and/or the third user does not acknowledge same within a pre-selected period of time.

8. The computer-implemented system according to claim 1, wherein the one or more processors are configured to execute instructions that cause the system to automatically notify the first user and/or the third user in the event any details in the pharmaceutical treatment regimen of the first or second user are changed.

9. The computer-implemented system according to claim 1, wherein the one or more processors are configured to receive, from the first user, proof of administration of a particular treatment using the first user device.

10. The computer-implemented system according to claim 9, wherein the proof of administration comprises any one or more of fingerprints, facial identification, retinal scan of either of the first or the second user and an image of the packaging of the administered pharmaceutical.

11. A computer-implemented method of recording, tracking and reporting administration of one or more pharmaceutical treatment regimens, the method comprising:
notifying a first user, using a first user device, the details of a particular pharmaceutical treatment regimen associated with the first user or a second user;
recording, using the first user device, details of the administration of a pharmaceutical according to the particular pharmaceutical treatment regimen; and
in the event of non-adherence to the particular pharmaceutical treatment regimen by the first user:
automatically notifying a third user, different to the first and second user, using a third user device associated with the third user, of the non-adherence to the particular pharmaceutical treatment regimen by the first user;
identify the location of the first user and/or the second user according to the GPS coordinates of the first user device associated with the first user or a second user device associated with the second user and send a notification to the third user device associated with the third user of the location of the first user and/or the second user; and
automatically operate a camera in the vicinity of the first user and/or the second user;
wherein the first user uses the first user device to access details regarding the medical history of the first user or the second user, the medical history comprising details regarding any allergies, medical record, action plan (in the event of non-adherence) and contact, medical and emergency details associated with the first or second user.

12. The computer-implemented method according to claim 11, wherein the first user is an individual requiring treatment.

13. The computer-implemented method according to claim 11, wherein the second user is an individual requiring treatment and the first user is an individual administering the pharmaceutical.

14. The computer-implemented method according to claim 11, wherein the details of the pharmaceutical treatment regimen entered by the first user using the first user device comprise at least the name of the pharmaceutical and any one or more of a dosage amount, a photo of the pharmaceutical/packaging, biometric information, a time(s) of administration and a method of administration.

15. The computer-implemented method according to claim 11, wherein the method further comprises generating a reminder notification comprising any one or more of an alarm, a message via short message service (sms), or electronic email (email) on the first and/or second user device.

16. The computer-implemented method according to claim 11, wherein the method further comprises generating and sending, to the first and/or second user device, an alert notification comprising any one or more of an automatic telephone call, a vibration alert, an alarm, a message via short message service (sms), or an electronic mail (email) in the instance of non-adherence with the pharmaceutical treatment regimen.

17. The computer-implemented method according to claim 11, wherein the method further comprises generating and sending the alert notification after a pre-selected period of time in the event of non-adherence.

18. The computer-implemented method according to claim 11, wherein the method further comprises notifying the first user and/or the third user in the event any details in the pharmaceutical treatment regimen of the first or second user are changed.

19. The computer-implemented method according to claim 11, wherein the first user enters proof of administration of the pharmaceutical using the first user device, the proof of administration comprising any one or more of fingerprints, facial identification, retinal scan of either of the first or the second user and an image of the packaging of the administered pharmaceutical.

20. A non-transitory computer-readable medium having a plurality of instructions executable by one or more processors to perform the steps of:

notifying a first user, using a first user device, the details of a particular pharmaceutical treatment regimen associated with the first user or a second user;

recording, using the first user device, details of the administration of a pharmaceutical according to the particular pharmaceutical treatment regimen;

accessing, using the first user device, details regarding the medical history of the first user or the second user, the medical history comprising details regarding any allergies, medical record, action plan (in the event of non-adherence) and contact, medical and emergency details associated with the first or second user; and in the event of non-adherence to the particular pharmaceutical treatment regimen by the first user:
  automatically notifying a third user, different to the first and second user, using a second user device associated with the third user, of the non-adherence to the particular pharmaceutical treatment regimen by the first user; and
  identify the location of the first user and/or the second user according to the GPS coordinates of the first user device associated with the first user or a second user device associated with the second user and send a notification to the third user device associated with the third user of the location of the first user and/or the second user; and
  automatically operate a camera in the vicinity of the first user and/or the second user.

* * * * *